United States Patent [19]

Bosse

[11] 4,274,896
[45] Jun. 23, 1981

[54] METHOD FOR MAKING SACKS WHICH ARE OPEN AT ONE END AND COMPRISE AN OUTER SACK OF WOVEN PLASTICS TAPE FABRIC

[75] Inventor: Frank Bosse, Tecklenburg i. W., Fed. Rep. of Germany

[73] Assignee: Windmoller & Holscher, Lengerich, Fed. Rep. of Germany

[21] Appl. No.: 79,246

[22] Filed: Sep. 27, 1979

[30] Foreign Application Priority Data

Oct. 2, 1978 [DE] Fed. Rep. of Germany ....... 2842954

[51] Int. Cl.³ ...................... B32B 31/08; B32B 31/18; B32B 31/20; D03D 47/50
[52] U.S. Cl. ......................................... 156/88; 156/91; 156/149; 156/227; 156/250; 156/290; 156/308.4; 156/475; 156/529; 229/55; 428/35
[58] Field of Search ............... 156/88, 91, 227, 244 A, 156/250, 256, 290, 291, 308.4, 524–526, 510, 498, 149, 269, 475, 529; 428/35; 229/55

[56] References Cited

U.S. PATENT DOCUMENTS

| 2,744,844 | 5/1956 | Wood et al. | 156/88 |
| 2,753,597 | 7/1956 | Bird et al. | 156/88 |
| 3,134,693 | 5/1964 | Curran | 156/88 |
| 3,385,747 | 5/1968 | Klein et al. | 156/517 |
| 3,567,537 | 3/1971 | Marteny et al. | 156/91 |
| 3,755,033 | 8/1973 | Emus | 156/88 |
| 3,823,047 | 7/1974 | Colombo | 156/498 |
| 3,855,037 | 12/1974 | Imhagen et al. | 156/510 |
| 3,856,599 | 12/1974 | Bylund | 156/88 |
| 3,861,124 | 1/1975 | Bentzien | 156/443 |
| 4,021,283 | 5/1977 | Weikert | 156/244.19 |
| 4,065,049 | 12/1977 | Acheldohl et al. | 229/55 |
| 4,174,804 | 11/1978 | Bosse | 428/35 |

FOREIGN PATENT DOCUMENTS 2327403 12/1974 Fed. Rep. of Germany .
2648235 4/1978 Fed. Rep. of Germany .
2721771 11/1978 Fed. Rep. of Germany .

*Primary Examiner*—Jerome W. Massie
*Attorney, Agent, or Firm*—Fleit & Jacobson

[57] ABSTRACT

Sacks are made from a web comprising a tube of stretched plastics tape fabric woven around a thermoplastic tubular film. The web is continuously fed to a storage device from which two-ply sack lengths are intermittently withdrawn and severed and provided with a stitched base seam. Each severing cut is made to extend through transverse strips of hot-melt adhesive which were applied to both sides of the fabric tube and cooled. After severing and prior to stitching through both plies, the inner ply is provided with a separate base seam by means of welding jaws.

5 Claims, 6 Drawing Figures

METHOD FOR MAKING SACKS WHICH ARE OPEN AT ONE END AND COMPRISE AN OUTER SACK OF WOVEN PLASTICS TAPE FABRIC

The invention relates to a method of making sacks which are open at one end and comprise a load-supporting outer sack of circular woven fabric consisting of stretched plastics tapes and a sealing inner sack of thermoplastic film connected thereto by the base seam, wherein a flattened tubular web defining the inner sacks has a tube of circular woven fabric defining the outer sacks woven around it, and tube sections are severed from the double tubular web and provided with a base seam engaging both tube sections, as well as to an apparatus for performing this method.

A method of this kind is known from prior Patent Application No. P 27 21 771.6-27. However, the subject of the prior patent application is primarily weaving a circular fabric of stretched plastics tapes around the flattened inner tube and the special construction of the side folds of the inner and outer tube.

A particular problem in the production of sacks from double tubular webs comprising an inner sack of thermoplastic film and an outer sack of a circular woven fabric of stretched plastics tapes resides in fixing the severed edges of the woven outer tube during severing of the tube sections and in the application of sealed base seams to the inner tubular webs. To avoid detrimentally influencing the strength of the stretched plastics tapes by a welded base seam, the base seam engaging through both tube sections is usually in the form of a stitched seam. However, a stitched seam is not able to seal the inner tube completely and consequently it is desirable to provide it with a sealed welded seam parallel to the stitched base seam.

It is therefore the problem of the present invention to provide a method and apparatus of the aforementioned kind with which tube sections having consolidated severed edges and having inner tubes provided with transverse weld seams can be severed in a simple manner from the double tubular web.

According to the invention, this problem is solved in a method of the aforementioned kind in that the flattened tube of circular woven fabric is provided at both sides with transversely extending hot-melt adhesive applications which are cooled directly after their application and the severing cuts separating the tube sections are made through the applied strips of hot melt adhesive, and that the inner tube sections are subjected at a narrow transverse zone through the webs of woven fabric at a spacing from the hot melt adhesive strips to a welding temperature below the relaxation temperature of the plastics tapes for a period such that they are provided with transverse weld seams. The method of the invention not only permits tube sections to be formed with consolidated severed edges for the woven outer tubes but also transverse weld seams in the inner tubes without detrimentally influencing the strength of the outer woven fabric.

The fixing of the subsequent cuts of a woven fabric of plastics tapes by means of an application of a hot-melt adhesive is known from DE-OS No. 23 27 403.

The base seams engaging both tube sections can be applied in a particularly favourable manner if the tube sections are moved in a suspended condition out of the transverse severing and welding station in the direction of their flat edges, and their upper marginal portions are turned over into a horizontal plane to apply the base seams. In this horizontal plane, they are rolled inwardly or provided with rider tapes and subsequently stitched. An apparatus for closing the ends of the tube sections by means of stitched seams is for example known from DE-OS No. 26 48 235.

An apparatus for performing the method of the invention and comprising means for storing that tube section length of continuously supplied double tubular web which has been intermittently pulled ahead by a pair of feed rollers is characterised according to the invention in that hot-melt adhesive nozzles are provided which are displaceable in guides at both sides of the double tubular web transferred into a vertical direction, are directed onto the woven walls thereof and are connected by a common support to cooling rollers running over the hot melt adhesive applications and to a downstream severing knife, and that welding jaws providing the inner tube with transverse weld seams are provided beneath the guides.

Other advantageous constructions of the invention have been described in the subsidiary claims.

One example of the invention will now be described in more detail with reference to the drawing, wherein.

Figure 1:
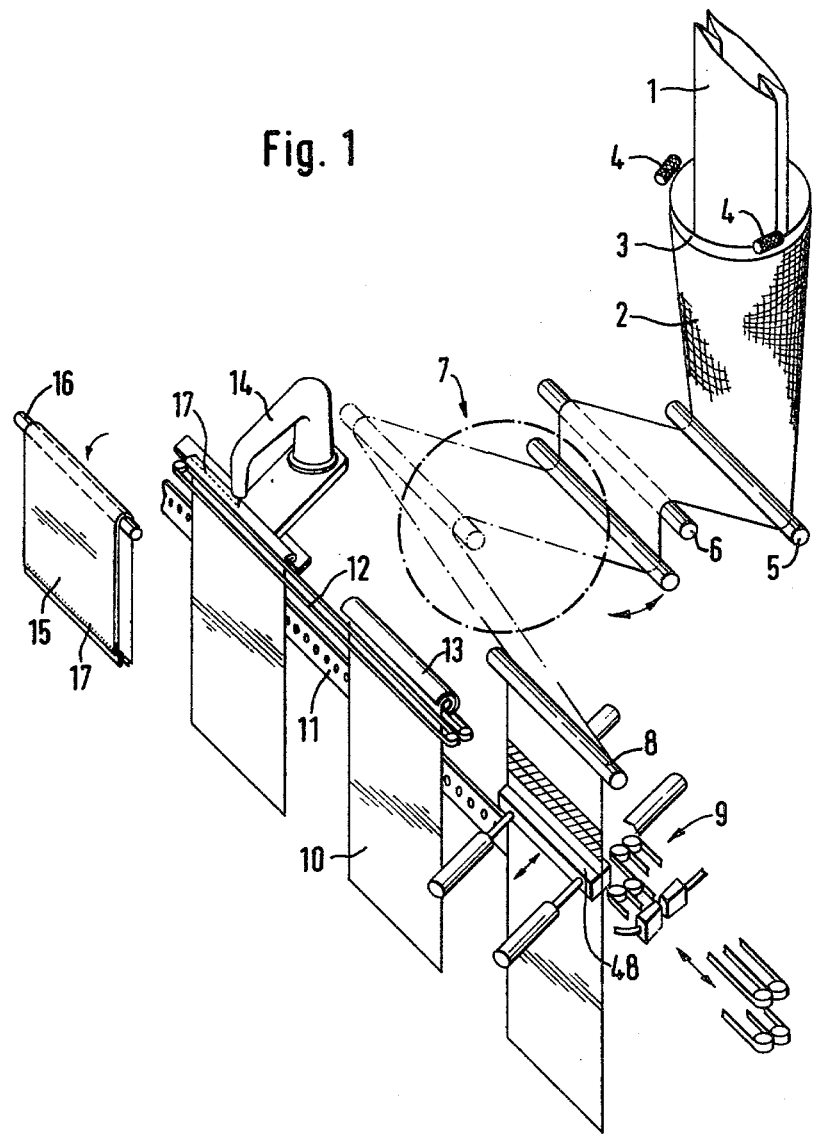
FIG. 1 is a diagrammatic representation of the individual method steps for making sacks open at one end from a circular woven tubular fabric having an internally disposed plastics tubular web.

To make the circular woven faabric tube from stretched plastics tapes with an internally disposed plastics tubular web, the PE tube 1, which may for example be provided with side folds, has the circular woven fabric tube 2 woven around it. Only the weaving ring 3 and two weft bobbins 4 of the circular loom are diagrammatically illustrated in FIG. 1. The circular woven fabric tube with internally disposed plastics tubular web 1 is flattened after weaving, only one flattening roller 5 being illustrated in FIG. 1. The flattened circular woven fabric tube 2 which could also be provided with side folds and has an internally disposed web 1 of tubular film is then fed by way of the direction-changing roller 6 to the web storage device 7 which is shown in more detail in FIG. 2. The double tubular web 1, 2 is pulled from the web storage device 7 in steps equal to the length of a tube section and fed by way of the direction-changing roller 8 in a vertical direction to the transverse cutting and welding device 9 which is shown in more detail in FIGS. 3 to 6. After the circular woven fabric tube has been fixed in the region of the severing cut, the internally disposed web of tubular film has been provided with base weld seams and the tube sections 10 have been cut from the double tubular web by transverse severing cuts, the tube sections 10 are taken over by suction belts 11 having a vertical conveying plane, the upper end regions of the tube sections 10 entering the double belt conveyors 12. The end portion of the tube sections 10 projecting beyond the double belt conveyors 12 is folded over once or twice by folding plates 13 and, while in a flanged relationship to the tube section 10, fed to the sewing machine 14 which produces a stitched seam through the singly or doubly folded end portion of the tube sections.

The finished sacks 15 provided with base seams 17 are then deposited in superposed relationship on the stacking rod 16 from which they can be taken in bundles.

Figure 2:
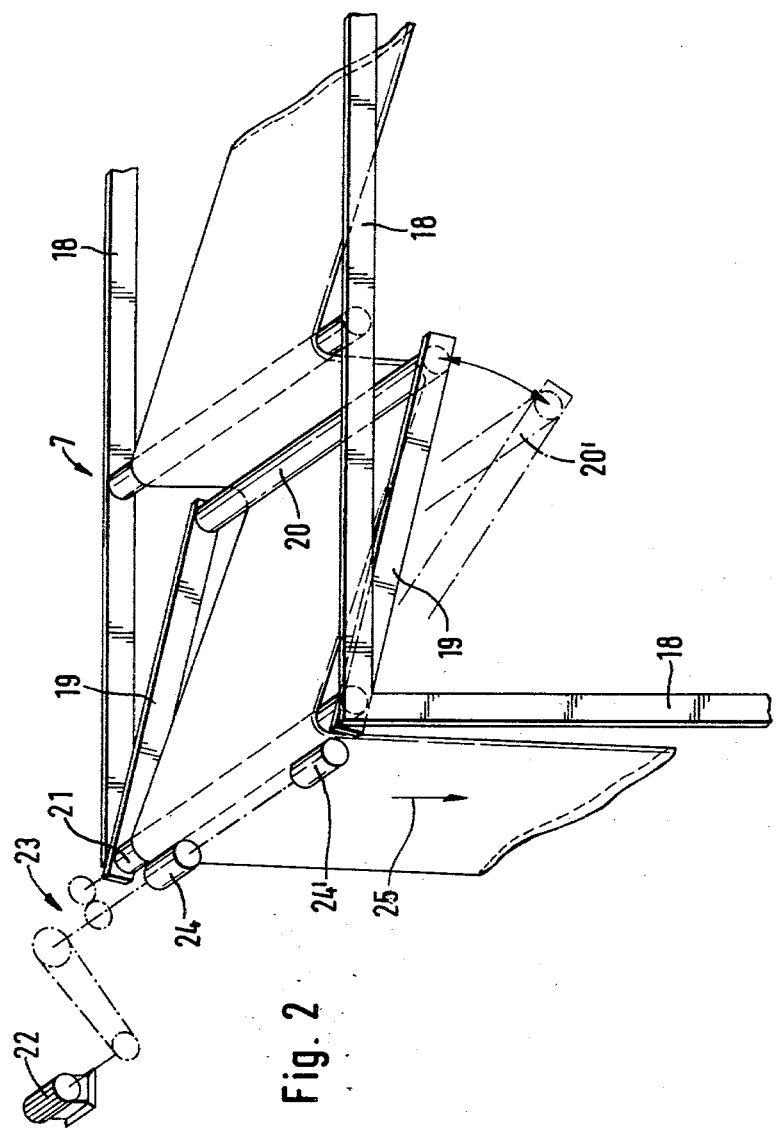
FIG. 2 is a diagrammatic perspective view of the web storage device of the apparatus for making the sacks open at one end.

The web storage device 7 shown in FIG. 2 consists of a pendulating roller 20 freely rotatable at the ends of swing arms 19 which, in turn, are pivotably mounted in the machine frame 18. Depending on the length of double web that is intermittently withdrawn, the pendulating roller 20 moves between the position shown in full lines and the position 20' shown in chain-dotted lines.

The web feeding device consists of the feeding roller 21 which is intermittently driven by the motor 22 by way of interposed driving means 23. The double tubular web is pressed against the feed roller 21 by pressure rollers 24, 24'. The double tubular web leaves the web storage device 7 in the direction of the arrow 25.

Figure 3:
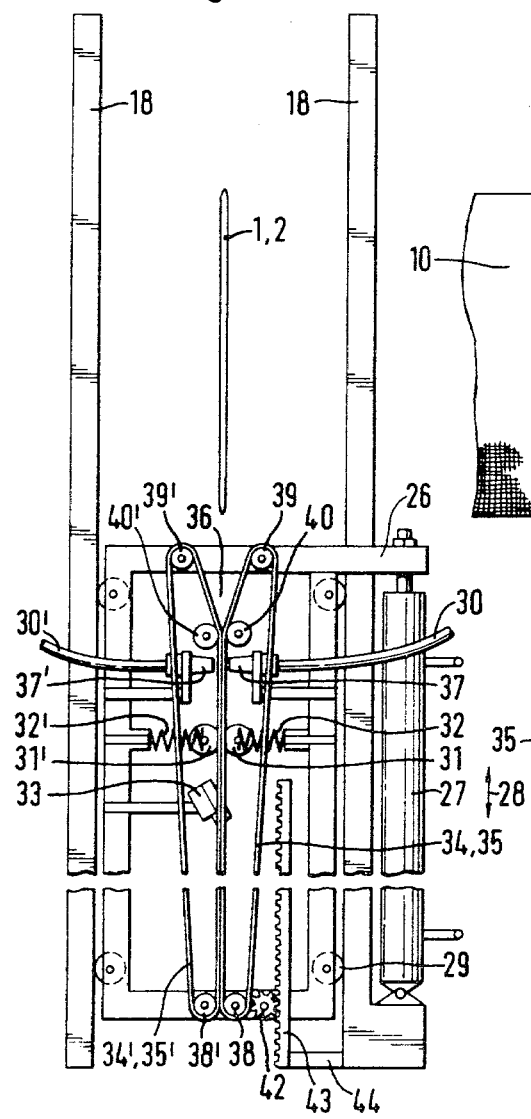
FIG. 3 is a diagrammatic plan view of the device for fixing the severed edges of the circular woven fabric tube and for severing tube sections.
Figure 4:
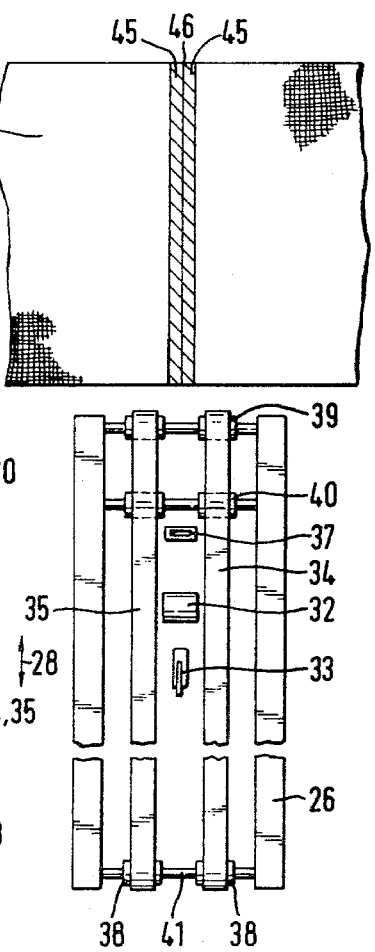
FIG. 4 is a side elevation of the FIG. 3 device.
Figure 5:
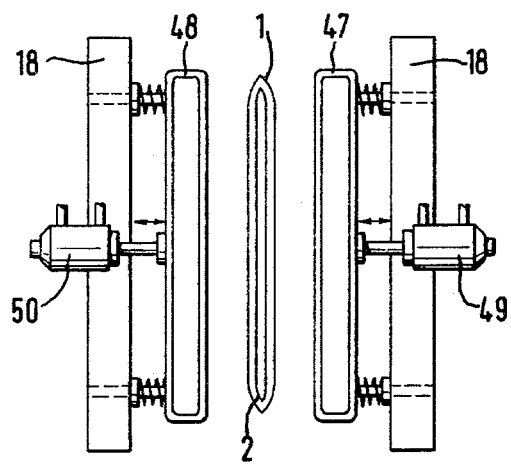
FIG. 5 is a diagrammatic plan view for forming the base weld seams of the inner tube sections.
Figure 6:
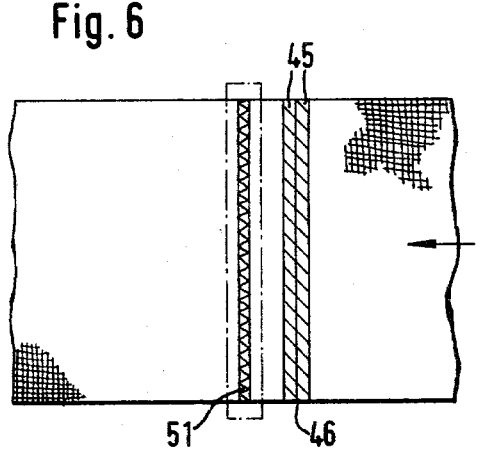
FIG. 6 is a side elevation of the circular woven fabric tubular web disposed in the transverse cutting and welding device.

As will be evident from FIGS. 3 and 4, guides are provided in the machine frame 18 for a carriage 26 which consists of a frame and which runs in the guides by way of rollers 29. The carriage 26 is secured to the piston rod of a piston-cylinder unit 27 of which the cylinder is pivoted to the machine frame 18. By means of the piston-cylinder unit 27, the carriage 26 can be reciprocated in the direction of the double arrow 28.

Hot-melt adhesive applicator nozzles 37, 37' are secured to supports on the carriage 26 at both sides of the vertical plane defined by the double tubular web 1, 2 which is transferred in the vertical direction. The hot-melt applicator nozzles 37, 37' are supplied with hot-melt adhesive through supply hoses 30, 30'. At both sides of the plane defined by the depending double tubular web 1, 2, pressure rollers 31, 31' subjected to springs 32, 32' and movable in guides (not shown) are provided behind the hot-melt applicator nozzles 37, 37'. The pressure rollers cool and consolidate the strips of hot-melt adhesive that were immediately previously applied to the outsides of the circular woven fabric tubular web.

Secured to the carriage by way of a support directly behind the oppositely acting pressure and cooling rollers 31, 31', there is a severing knife 33 wich executes a severing cut centrally through the applied hot-melt adhesive strips for the purpose of severing double tubular web sections.

Above and below the hot-melt applicator nozzles 37, 37' arranged in a horizontal plane, the pressure and cooling rollers 31, 31' and the severing knife 33, there are belts 34, 34' and 35, 35' which together form double belt conveyors, have a conveying plane disposed in the vertical plane defined by the depending double tubular web and move over rollers 38, 38', 39, 39' and 40, 40'.

The belts 34, 35 in the form of pressure belts running over rollers 38 secured on a common shaft 41 are driven by a gear (not shown) secured to the shaft 41 and by way of a gear 42 which engages with the rack 43 secured in the machine frame 18 by way of the support 44. If the carriage 26 is displaced by the piston-cylinder unit 27, the gear 42 rolls on the fixed rack 43 so that the pressure belts 34, 34' and 35, 35' move at a speed corresponding to the speed of the carriage but opposite to the speed of the carriage. The rollers 39, 40 and 39', 40' are mutually staggered in such a way that the pressure belts 34, 34' and 35, 35' running over them form an inlet gap 36. On displacement of the carriage 26 by the piston-cylinder unit 27, the vertically depending double tubular web 1, 2 enters the inlet gap 36, is engaged by the pressure belts 34, 34' and 35, 35' and is held stationary between same relatively to the machine frame because they move at a speed equal but opposite to the carriage speed.

When the carriage 26 has been displaced to an extent equal to the width of the depending double tubular web 1, 2, the severed edges of the circular woven fabric tubular web formed by the severing cut 46 will have been fixed by the hot-melt adhesive applications 45.

Beneath the plane of movement of the carriage 26 and to both sides of the depending double tubular web 1, 2, welding jaws 47, 48 are provided which can be moved towards each other by compressed air cylinders 49, 50 and which provide the PE inner tube with a welded base seam 51 applied through the circular woven fabric tubular web.

The tube sections 10 with severed edges consolidated by the hot-melt adhesive strips and with welded base seams 51 in the inner tube 1 are subsequently taken over by the suction belt 11 and, after turning over the upper marginal portions, provided with base seams 17 which are disposed above the sealed welded base seams 51 in the inner tube 1.

What is claimed is:

1. A method of making sacks which are open at one end and comprise a load-supporting outer sack of circular woven fabric comprising stretched plastics tapes and a sealing inner sack of thermoplastic film connected thereto by a base seam, the inner sack having a melting point less than the melting point of the outer sack, said method comprising:
    weaving a tube of circular woven fabric defining the outer sack around a flattened tubular web defining the inner sack;
    applying transversely-extending strips of hot-melt adhesive to both sides of the flattened tube of circular woven fabric;
    contacting the strips of applied adhesive with rollers to thereby cool the adhesive;
    separating individual tube sections from the tube by severing cuts through the cooled applied strips of adhesive;
    applying a welding temperature below the relaxation temperature of the plastics tape through the webs of woven fabric to a narrow transverse zone spaced from the adhesive strips for a time period sufficient to form a transverse weld seam in the inner sack; and
    applying a base seam engaging the inner and outer sacks to the tube section to complete formation of the individual sack.

2. A method according to claim 1, wherein the flattened tube of circular woven fabric is vertically oriented before application of the hot-melt adhesive.

3. A method according to claim 1 or 2, further comprising moving an individual tube section after severing thereof in the direction of its severed edge, and turning over an upper marginal portion of the sack onto the plane of the sack prior to applying the base seam.

4. A method according to claim 3, wherein the base seam is applied by stitching through the turned over marginal portion of the sack.

5. A method according to claim 1, further comprising temporarily accumulating the flattened tube of circular woven fabric prior to applying the hot-melt adhesive.

* * * * *